United States Patent
Farrell et al.

(10) Patent No.: US 6,282,518 B1
(45) Date of Patent: Aug. 28, 2001

(54) PROCESS FOR INTERNET ORDERING OF INDUSTRIAL PRODUCTS

(75) Inventors: Peter J. Farrell, Danbury; Eugene E. Madara, Easton, both of CT (US)

(73) Assignee: ABB Automation Group Ltd., Zurich (CH)

(*) Notice: Subject to any disclaimer, the term of this patent is extended or adjusted under 35 U.S.C. 154(b) by 0 days.

(21) Appl. No.: 09/243,168

(22) Filed: Feb. 2, 1999

(51) Int. Cl.⁷ .................................................. G06F 17/60
(52) U.S. Cl. .......................... 705/26; 705/22; 705/27; 700/231; 700/232
(58) Field of Search ............................... 705/26, 27, 8, 705/22; 700/231, 232, 233, 234, 236

(56) References Cited

U.S. PATENT DOCUMENTS 5,311,438 * 5/1994 Sellers et al. ............................. 705/8
5,369,570 * 11/1994 Parad ........................................ 705/8

OTHER PUBLICATIONS

Web malls add online purchasing, Business Marketing, PP 1–13, May, 1997.*
Newswire Trade, RS components, PP 1–2, Feb. 1998.*
Target Marketing, Yoegel Rob, Electronic commerce, PP 1–3, Jul. 1996.*
Apparel Industry, Staci Bonner, PP 1–5, Dec. 1997.*

* cited by examiner

*Primary Examiner*—Paul R. Lintz
*Assistant Examiner*—Mussie Tesfamariam
(74) *Attorney, Agent, or Firm*—Michael M. Rickin

(57) ABSTRACT

A process for making industrial products available by the manufacturer of the industrial products for online ordering through a communications network such as the Internet by a customer for the industrial products that has access to the communications network.

4 Claims, 5 Drawing Sheets

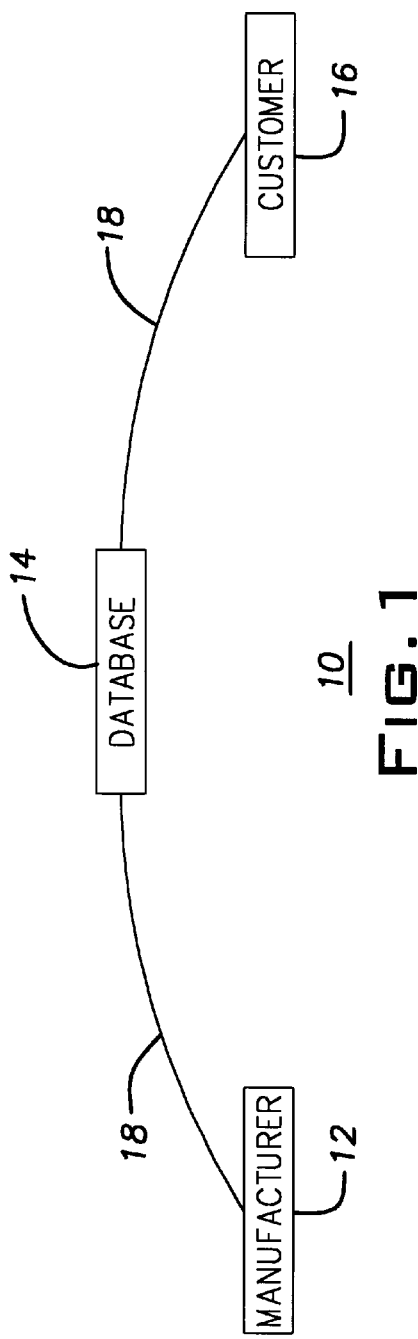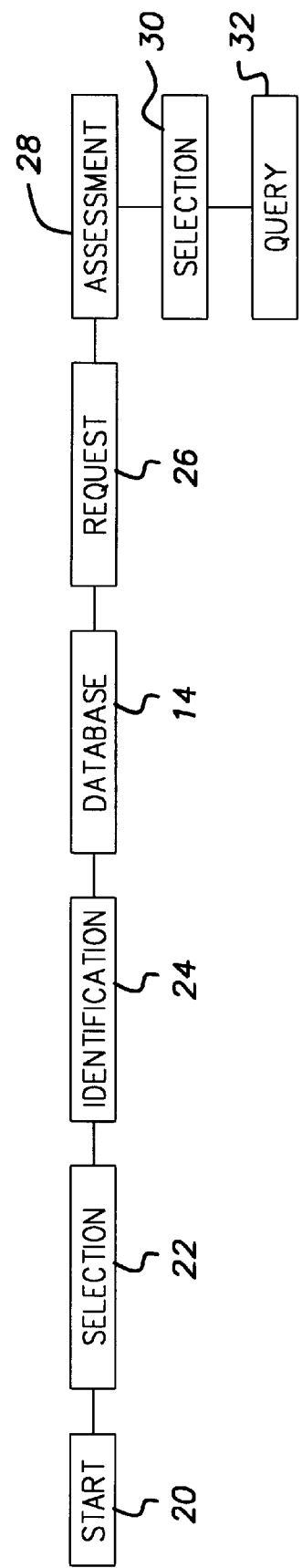

FIG. 4

| Configure a drive ▽ | Home | Site Map | Feedback | Contact Us | Distributors |

Search for a Drive

Horse Power/ KW
[1 hp / .75 kW ▽]
Phase
[Three phase ▽]
Voltage
[380-480V ▽]

[Submit]

[Shopping Cart]

AC Drive Configuration

AC Drive: ACS 140-1 hp
Configuration: ACS 143-1KB-3
Base price: $648.00 each
Configuration Price: $648.00 each
Description:
 ACS 140 1hp/.75kW; Three Phase, 380-480V

Standard Features (i)

- Wall Mount
- Flange Mount
- Din Rail Mount
- 2 - Analog Inputs
- 5 - Programable Digital Inputs
- 2 - Programable Relay Outputs
- 1 - Programable Analog Output
- Modbus Communications I/O
- Protected Chassis -IP20
- Removable Control Panel Keyboard

Optional Features (i)

☐ Control Panel Cable add: $37.00

☐ RS232/485 Adaptor add: $65.00

RFI Filter Options (i)
[NOT Included: Select One ▽]

Dynamic Braking Options (i)
[NOT Included: Select One ▽]

Quantity: [1]

[Configure]  [Reset]  [Cancel]

Search for a Drive

Horse Power/ KW: 1 hp / .75 kW
Phase: Three phase
Voltage: 380-480V

[Submit]

[Shopping Cart]

The configuration listed below is the result of your customization.

AC Drive: ACS 140-1 hp
Configuration: ACS 143-1KB-3
Base price: $648.00 each
Configuration Price: $1,025.00
Quantity: 3

Standard Features:
- Wall Mount
- Flange Mount
- Din Rail Mount
- 2 - Analog Inputs
- 5 - Programable Digital Inputs
- 2 - Programable Relay Outputs
- 1 - Programable Analog Output
- Modbus Communications I/O
- Protected Chassis - IP20
- Removable Control Panel Keyboard

Optional Features:
- Control Panel Cable

RFI Filter Options:
- RFI Filter - 3 phase

Dynamic Braking Options:
- Dynamic Braking Option B

To view the exclusive Terms and Conditions of Sales on which Comp-AC products are sold, click here.

[Add to Shopping Cart]   [Cancel]

PROCESS FOR INTERNET ORDERING OF INDUSTRIAL PRODUCTS

BACKGROUND OF THE INVENTION

This invention relates to industrial product ordering processes, and more specifically, to a process for making industrial products available by the manufacturer of the industrial products for ordering through the Internet by a customer for the industrial products.

There have long existed processes for ordering products, be they consumer products, industrial products or for that matter any other type of products. In their earliest, as well as simplest, form, such processes for ordering products essentially have included the following steps or some variant thereof. Namely, the product supplier has made its products physically available at its facility, and the customer has gone to the product supplier's facility for purposes of viewing the products that the product supplier has available followed therafter by a placement by the customer with the product supplier of an order for the product(s) that the customer desires. Over the passage of time, many variations to the aforedescribed process for ordering products have been proposed for adoption or have simply been adopted.

One such variation, by way of exemplification and not limitation, to the aforedescribed process is that wherein the product supplier either as a substitute for making its products physically available at its facility or as a supplement thereto prepares a catalogue of its products for distribution to prospective customers for the product supplier's products. The availability to prospective customers of such a catalogue of the product supplier's products enables the prospective customer to place an order with the product supplier based on what is contained in the catalogue. As such, the existence of the catalogue obviates the necessity for the prospective customer to have to go to the product supplier's facility to view the products, which have been made physically available by the product supplier at its facility, before the prospective customer can place an order for the product (s) that the customer desires.

Another such variation, by way of exemplification and not limitation, to the aforedescribed process is that wherein the prospective customer, either after having actually viewed the product supplier's products at the product supplier's facility or after having viewed the product supplier's products in the product supplier's catalogue, places an order with the product supplier for the product(s) that the prospective customer desires through the use of any one of a variety of different means that are suitable for use for such a purpose. For instance, the prospective customer may avail itself of the use of the mails for such a purpose, or may avail itself of the use of the telephone for such a purpose, or may avail itself of the use of some form of electrical/electronic means other than the telephone for such a purpose, etc.

Yet another such variation, by way of exemplification and not limitation, to the aforedescribed process is that wherein the prospective customer places its initial order with the product supplier for the product(s) that the prospective customer desires. Thereafter, when the prospective customer desires to place a subsequent order for the same product(s) with the product supplier, the prospective customer does so either by simply notifying the product supplier of this fact and referring the product supplier to the prospective customer's initial order for the same product(s) or does so by granting in advance to the product supplier authorization whereby upon the occurrence of some readily identifiable event, such as the occurrence of a calendar event or the occurrence of some weather-related event, i.e., "degree days", the product supplier is authorized to automatically on behalf of the prospective customer initiate for the prospective customer an order for the product(s) that the prospective customer desires.

The impetus for many of the variations to the aforedescribed process, which heretofore have been proposed for adoption or which have actually been adopted, has been occasioned, by and large, by advances in technology that have occurred in one form or another. For instance, the significant increase in the use of catalogues by the product supplier as a means of bringing the product supplier's products directly to a prospective customer therefor has been occasioned by the fact that the costs associated with the preparation of such catalogues by the product supplier as well as the costs associated with the distribution thereof by the product supplier to prospective customers for the products contained in such catalogues has proven to be cost-effective to the product supplier based on the number of orders placed with the product supplier for products contained in such catalogues by prospective customers therefor. In large part the reason for this has been the technological advances that have reduced the cost of preparing such catalogues as well as the cost thereafter of distributing such catalogues to those prospective customers who are most likely to place an order with the product supplier for products that are contained in the catalogues.

Similarly, the surge in the amount of use of the telephone or the use of some of electrical/electronic means other than the telephone by the prospective customer for placing an order directly with the product supplier for the product(s) that the prospective customer desires has resulted in large part from the fact that the prospective customer derives several benefits by doing so. Namely, normally by doing so the prospective customer finds that the time required by the product supplier to fill the order placed therewith by the prospective customer is shortened considerably. As such, the prospective customer receives the product(s) desired thereby from the product supplier much sooner and thus the prospective customer is able to make use of the product(s) more quickly. Secondly, since in most instances there is no intermediate entity through whose hands the order for the product(s) that the prospective customer desires must pass, the cost to the prospective customer of the product(s) ordered by the prospective customer from the product supplier is normally less.

With the advent now of changes being made essentially on a continuous basis in the techniques that can be utilized for purposes of effecting therewith electrical/electronic communications, including but not limited to inter-computer networks, e.g., the Internet, or to intra-computer networks, e.g., local area networks (LANS), between virtually any parties that are located practically any place in the world, a number of further variations, which are reflective of the continuous changes now being made in electrical/electronic communications techniques, are now being proposed for adoption insofar as the aforedescribed process is concerned or are simply actually being adopted insofar as the aforedescribed process is concerned. By way of exemplification and not limitation in this regard, reference is had herein, for instance, to U.S. Pat. No. 4,992,940 entitled "System And Method For Automated Selection Of Equipment For Purchase Through Input Of User Desired Specifications", which issued on Feb. 12, 1991. In accordance with the teachings of U.S. Pat. No. 4,992,940, there is provided an automated system that assists a user in locating and purchasing goods or services sold by a plurality of vendors. The system includes a programmed computer, which is linked to a database. The database contains information about a large number of different products and/or services, arranged in various categories. For each product or service, the database contains information on price, vendor, specifications and/or availability. In operating the system, the user first indicates the general type of product or service desired. The system responds by displaying a template giving specifications for the type of product or service selected. The user then fills in one or more blank spaces in the template, to tell the system the minimum desired specifications for the product or service. The computer then searches the database to retrieve all products or services, within the product or service category selected, having the specifications required by the user. The system displays such products or services to the user, who can request more detailed information about a particular product or service, or information on vendors and prices. The user can then select one or more items for immediate purchase, and the system automatically transmits the order to the appropriate vendor.

Reference, by way of exemplification and not limitation in this regard, is also had herein, for instance, to U.S. Pat. No. 5,768,142 entitled "Method And Apparatus For Storing And Selectively Retrieving Product Data Based On Embedded Expert Suitability Ratings", which issued on Jun. 16, 1998. In accordance with the teachings of U.S. Pat. No. 5,768,142, there is provided an allegedly improved apparatus and method of storing, selectively retrieving and delivering product data, which includes a database of product data files and a computer that causes the data to be retrieved, displayed and delivered to the customer. The customer is asked to specify certain criteria relating to the kind of product he desires. Stored with the data relating to each product is an expert judgment factor that indicates how well the product would fill each possible criteria specified by the customer. Upon receiving the criteria entered by the customer, the computer calculates a suitability rating for each product by combining those judgment factors that relate to the customer entered criteria. The computer then presents to the customer the data relating to a limited number of the highest rated products. The customer selects the product that he wants and is preferably allowed to make changes to the product data. The computer then causes the product or data relating to the product to be delivered to the customer.

Reference, by way of exemplification and not limitation in this regard, is in addition had herein, for instance, to U.S. Pat. No. 5,806,046 entitled "Method And Apparatus For Selecting A Vehicle Seat And Obtaining User Information", which issued on Sep. 8, 1998. In accordance with the teachings of U.S. Pat. No. 5,806,046, there is provided an apparatus for selecting a vehicle seat and obtaining user information, which includes a central processing unit (CPU) connected to an input device, a monitor, a speaker and a memory. A method of operating the apparatus includes storing a plurality of vehicle interior photographs in the memory, generating screens on the monitor and audio on the speaker requesting user related information be entered utilizing the input device, utilizing the user entered information to select a vehicle having the seat best suited for the user, displaying the stored photograph of the selected vehicle interior on the monitor and storing the user entered information in the memory.

It should be pointed out here that the variations that have been made to date to the aforedescribed process in effect have all been directed towards achieving an optimization of the aforedescribed process. As such, these variations to the aforedescribed process have not taken full advantage of the benefits that might otherwise be derived therefrom if the objective were to devise a product ordering system wherein the benefits to be derived from an optimization of the developments, which are occurring in electric/electronics communications, were to be fully taken advantage of insofar as the applicability of such developments in electric/electronic communications to a product ordering system is concerned.

A need has, therefore, been evidenced in the prior art for a new and improved product ordering system that is predicated upon taking full advantage of the current developments in electric/electronic communications. More specifically, a need has been evidenced in the prior art for such a new and improved product ordering system that is particularly suited for use as a process for making available industrial products by the manufacturer thereof for online ordering through a communication network accessible to a customer desiring to place an order for such industrial products. To this end, there has been evidenced in the prior art a need for such a new and improved process for making available industrial products by the manufacturer thereof for online ordering through a communication network accessible to a customer desiring to place an order for such industrial products that is characterized in a number of respects. One such characteristic of such a new and improved process operative for ordering industrial products is that it would be possible therewith for any customer having access thereto to place an order for such industrial product(s) as the customer desires. A second such characteristic of such a new and improved process operative for ordering industrial products therewith is that it would be possible through the use thereof for any customer having access thereto to place an order for such industrial product(s) as the customer desires from virtually any place in the world. A third such characteristic of such a new and improved process operative for ordering industrial products therewith is that it would be possible through the use thereof for a customer having access thereto to place an order for the industrial products that have been made available by the manufacturer thereof based upon a selection by the manufacturer of such industrial products as a subset of an inventory set of industrial products. A fourth such characteristic of such a new and improved process operative for ordering industrial products therewith is that it would permit the querying of the customer as to the customer's desire to place an order for at least one of such industrial products. A fifth such characteristic of such a new and improved process operative for ordering industrial products therewith is that it would allow the manufacturer of such industrial products to effect an identification of the key parameters involved in a selection of a subset of the industrial products from an inventory set of industrial products that includes all of the industrial products, which may be made available by the manufacturer for online ordering by customers through a communications network to which the customers have access. A sixth such characteristic of such a new and improved process operative for ordering industrial products therewith is that it would permit the placing of such key parameters for such industrial products in a database of the industrial products that are available to a customer for the placing thereby of an order therefor. A seventh such characteristic of such a new and improved process operative for ordering industrial products therewith is that it would permit the database of the industrial products that are available for ordering by a customer to be made accessible through a communications network to any customer for such industrial products having access to such communications network. An eighth such characteristic of such a new and improved process operative for ordering industrial products therewith is that it would permit a connection to be effected by a customer for such industrial products through such communications network to the database containing the key parameters for the industrial parameters. A ninth such characteristic of such a new and improved process operative for ordering industrial products therewith is that it would permit a manufacturer to effect a request through such communications network for specific information from the customer for subsequent assessment of such requested information with respect to the key parameters for the industrial products in the database containing key parameters for the industrial products. A tenth such characteristic of such a new and improved process operative for ordering industrial products therewith is that it would permit the manufacturer to effect an identification of a subset of industrial products based on an assessment of the requested specific information provided by the customer for the industrial products relative to the key parameters for the industrial products contained in the database such that the subset of industrial products includes at least one particular industrial product selected by the manufacturer based upon the at least one particular industrial product's suitability for meeting the customer's specific requirement for an industrial product. An eleventh such characteristic of such a new and improved process for ordering industrial products therewith is that it would permit the customer to be queried through the communications network as to whether the customer for the industrial product desired to place an order with the manufacturer for the at least one particular industrial product identified by the manufacturer based upon the suitability of the at least one particular industrial product to meet the customer's specific requirement for an industrial product.

It is, therefore, an object of the present invention to provide a new and improved process for ordering industrial products therewith that is predicated upon taking full advantage of the current developments in electric/electronic communications.

It is a further object of the present invention to provide such a process for ordering industrial products therewith that is particularly suited for use as a process for making available industrial products by the manufacturer thereof for online ordering through a communication network accessible to a customer desiring to place an order for such industrial products.

It is a still further object of the present invention to provide such a new and improved process for ordering industrial products therewith that is characterized by the fact that it is possible therewith for any customer having access thereto to place an order for such industrial product(s) as the customer desires.

It is another object of the present invention to provide such a new and improved process for ordering industrial products therewith that is characterized by the fact that it is possible through the use thereof for any customer having access thereto to place an order for such industrial product(s) as the customer desires from virtually any place in the world and at any time, day or night, that the customer so chooses to do so.

It is still another object of the present invention to provide such a new and improved process for ordering industrial products therewith that is characterized by the fact that it is possible through the use thereof for a customer having access thereto to place an order for the industrial products that have been made available by the manufacturer thereof based upon a selection by the manufacturer of such industrial products as a subset of an inventory set of industrial products.

It is still yet another object of the present invention to provide such a new and improved process for ordering industrial products therewith that is characterized by the fact that it permits the querying of the customer as to the customer's desire to place an order for at least one of such industrial products.

Another object of the present invention is to provide such a new and improved process for ordering industrial products therewith that is characterized by the fact that it allows the manufacturer of such industrial products to effect an identification of the key parameters involved in a selection of a subset of the industrial products from an inventory set of industrial products that includes all of the industrial products, which may be made available by the manufacturer for online ordering by customers through a communications network to which the customers have access.

A still another object of the present invention is to provide such a new and improved process for ordering industrial products therewith that is characterized by the fact that it permits the placing of the key parameters for the industrial products in a database of the industrial products that are available to a customer for the placing thereby of an order therefor.

A further object of the present invention is to provide such a new and improved process for ordering industrial products therewith that is characterized by the fact that it permits the database of the industrial products that are available for ordering by a customer to be made accessible through a communications network to any customer for such industrial products having access to such communications network.

A still further object of the present invention is to provide such a new and improved process for ordering industrial products therewith that is characterized by the fact that it permits a connection to be effected by a customer for the industrial products through the communications network to the database containing the key parameters for such industrial products.

Yet an object of the present invention is to provide such a new and improved process for ordering industrial products therewith that is characterized by the fact that it permits a manufacturer to effect a request through the communications network for specific information from the customer for subsequent assessment of such requested information with respect to the key parameters for the industrial products in the database that contains the key parameters for the industrial products.

Yet a further object of the present invention is to provide such a new and improved process for ordering industrial products therewith that is characterized by the fact that it permits the manufacturer to effect an identification of a subset of industrial products based on an assessment of the requested specific information provided by the customer for the industrial products relative to the key parameters for the industrial products contained in the database such that the subset of industrial products includes at least one particular industrial product selected by the manufacturer based upon the at least one particular industrial product's suitability for meeting the customer's specific requirement for an industrial product.

Yet another object of the present invention is to provide such a new and improved process for ordering industrial products therewith that is characterized by the fact that it permits the customer to be queried through the communications network as to whether the customer for the industrial product desires to place an order with the manufacturer for the at least one particular industrial product identified by the manufacturer based upon the suitability of the at least one particular industrial product to meet the customer's specific requirement for an industrial product.

SUMMARY OF THE PRESENT INVENTION

In accordance with the present invention there is provided a new and improved process for making available industrial products by the manufacturer thereof for online ordering by customers through a communications network accessible to the customers, the industrial products being made available based upon a selection by the manufacturer of such industrial products as a subset of an inventory set of industrial products, and for querying such customers as to their desire to place an order for at least one of the selected industrial products. The subject process of the present invention includes the steps of effecting an identification by the manufacturer of the key parameters involved in a selection of a subset of the industrial products from an inventory set of industrial products wherein the inventory set of industrial products includes all of the industrial products that may be made available by the manufacturer for online ordering by customers through a communications network, placing such key parameters for the industrial products in a database of the industrial products that are available for ordering by the customer, making the database of the industrial products that are available for ordering by a customer accessible through the communications network to any customer for such industrial products having access to the communications network, effecting a connection by a customer for such industrial products through the communications network to the database containing the key parameters for the industrial products, effecting a request by the manufacturer through the communications network for specific information from the customer for subsequent assessment of such requested specific information with respect to the key parameters for the industrial products in the database containing key parameters for the industrial products, effecting an identification by the manufacturer of a subset of industrial products based on an assessment of the requested specific information provided by the customer for the industrial products relative to the key parameters for the industrial products contained in the database wherein the subset of industrial products includes at least one particular industrial product selected by the manufacturer based upon the suitability of the at least one particular industrial product for meeting a specific requirement of the customer for an industrial product, and effecting a query through the communications network as to whether the customer for the industrial products desires to place an order with the manufacturer for the at least one particular industrial product identified by the manufacturer based upon the suitability of the at least one particular industrial product for meeting a specific requirement of the customer for an industrial product.

BRIEF DESCRIPTION OF THE DRAWINGS

FIG. 1 is a schematic representation in block diagram form of a process for making available industrial products by the manufacturer thereof for online ordering by customers therefor through a communications network accessible to customers, constructed in accordance with the present invention;

FIG. 2 is a flow diagram of the steps of operation of the process, in accordance with the present invention, for making available industrial products by the manufacturer thereof for online ordering by customers therefor through a communications network accessible to customers;

FIG. 4 is a Customization screen generated in the course of implementing the process, in accordance with the present invention, for making available industrial products by the manufacturer thereof for online ordering by customers thereof through a communications network accessible to customers;

FIG. 5 is a Configuration screen generated in the course of implementing the process, in accordance with the present invention, for making available industrial products by the manufacturer thereof for online ordering by customers therefor through a communications network accessible to customers; and FIG. 6 is a Selected Product screen generated in the course of implementing the process, in accordance with the present invention, for making available industrial products by the manufacturer thereof for online ordering by customers therefor through a communications network accessible to customers.

DESCRIPTION OF THE PREFERRED EMBODIMENT

Figure 3:
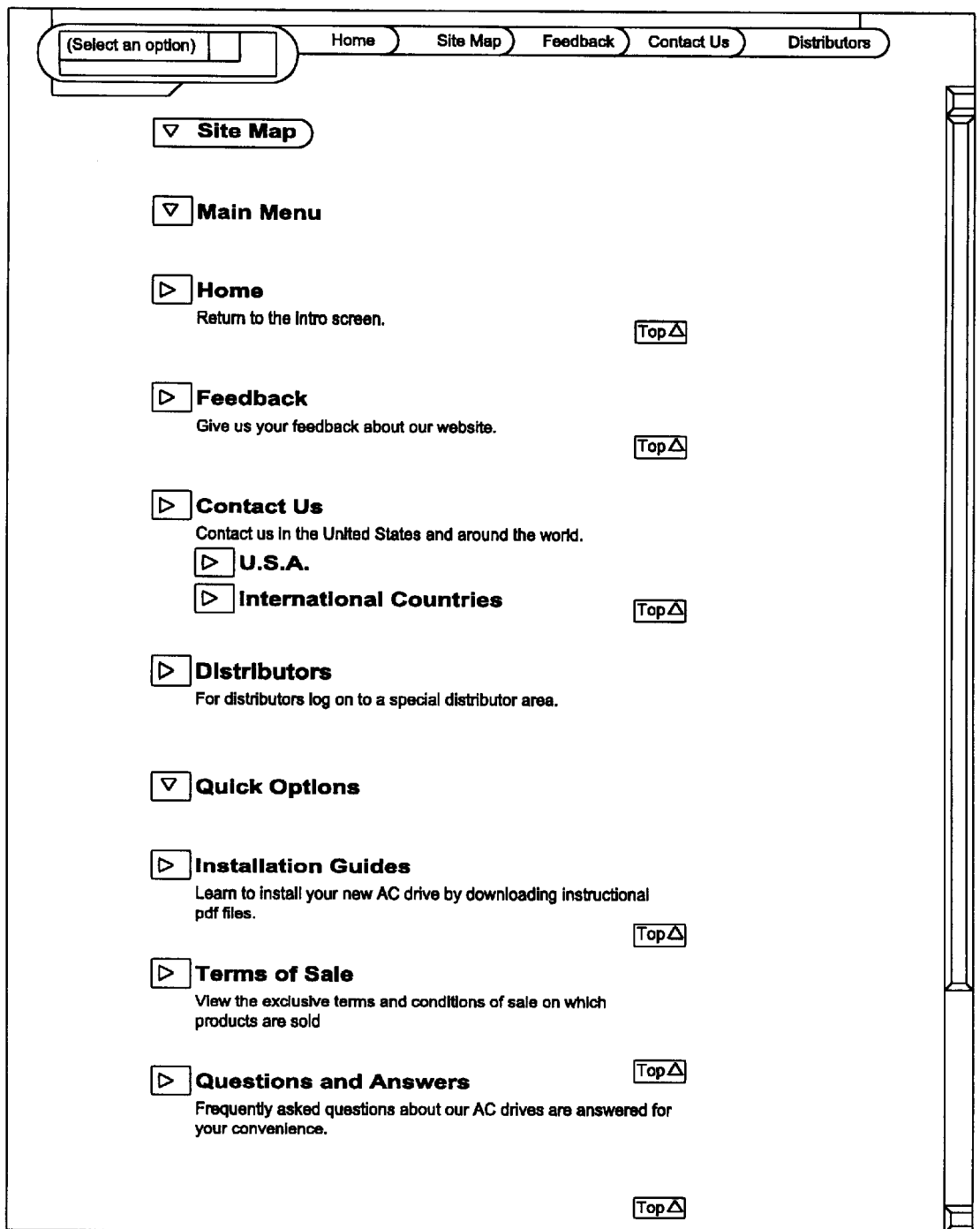
FIG. 3 is a Site Map screen generated in the course of implementing the process, in accordance with the present invention, for making available industrial products by the manufacturer thereof for online ordering by customers therefor through a communications network accessible to customers.

Reference will now be had to the drawings, and more particularly to FIGS. 1 and 2 thereof, for a description of the process, generally designated by the reference numeral 10 in FIG. 1, for making available industrial products by the manufacturer thereof for online ordering by customers therefor through a communications network available to the customers. As shown in FIG. 1 of the drawings, the principal elements of the process 10 are the manufacturer, generally designated by the reference numeral 12 in FIG. 1, a database, generally designated by the reference numeral 14 in FIG. 1, the customer, generally designated by the reference numeral 16 in FIG. 1, and the communications network, generally designated by the reference numeral 18 in FIG. 1. In accordance with the best mode embodiment of the present invention, the communications network 18 preferably comprises the Internet. However, the communications network 18 could also comprise other forms of an electric/electronic communications network other than the Internet without departing from the essence of the present invention.

In FIG. 2 of the drawings there is shown the steps in the operation of the process 10 in accordance with the present invention. A description of these steps will now be had herein with reference in particular to FIG. 2 of the drawings. To this end, these steps begin at the box, generally designated by the reference numeral 20 in FIG. 2, labeled "START". In accordance with the first step thereafter as denoted by the box, generally designated by the reference numeral 22 in FIG. 2, labeled "SELECTION" is the selection by the manufacturer 12 of the industrial products to be made available thereby for online ordering by a customer 16 therefor. The industrial products that are selected in this regard by the manufacturer 12 comprise a subset of an inventory set of the industrial products of the manufacturer 12. Continuing, the manufacturer 12 as denoted by the box, generally designated by the reference numeral 24 in FIG. 2, labeled "IDENTIFICATION" next effects an identification of the key parameters involved in a selection of a subset of the industrial products from an inventory set of industrial products. The inventory set of industrial products includes all of the industrial products that may be made available by the manufacturer 12 for online ordering by customers 16 therefor through the communications network 18 accessible to the customers 16.

With further reference to FIG. 2 of the drawing, as best understood with reference thereto, the next step in the process 10 is for the manufacturer 12 to place such key parameters for the industrial products in the database 14, denoted in FIG. 2 by the box, identified by the reference numeral 14 and labeled "DATABASE". The database 14 as best understood with reference to FIG. 1 of the drawings is made accessible to customers 16 through the communications network 18. Moreover, also as best understood with reference to FIG. 1 of the drawings a connection is effected between the customers 16 and the database 14 containing the key parameters for the industrial products by means of the communications network 18 to which both the customers 16 and the database 14 are connected.

Completing a description of the steps of the process 10, a request, denoted by the box, generally designated by the reference numeral 26 in FIG. 2, labeled "REQUEST" is next effected by the manufacturer 12 through the communications network 18 for specific information from the customer 16. As will be best understood with reference to FIG. 1 of the drawings, the manufacturer 12 and the customer 16 are interconnected with each other through the communications network 18. The requested specific information from the customer 16 is then utilized by the manufacturer 12 for purposes of accomplishing a subsequent assessment, such assessment being denoted by the box, generally designated by the reference numeral 28 in Figure and labeled "ASSESSMENT" therein, of such requested specific information with respect to the key parameters for the industrial products that are contained in the database 14. The manufacturer 12 thereafter effects an identification, such identification being denoted by the box, generally designated by the reference numeral 30 in Figure and labeled "SELECTION" therein, of a subset of industrial products based on the assessment of the requested specific information provided by the customer 16 for the industrial products relative to the key parameters for the industrial products contained in the database 14 such that the subset of industrial products includes at least one particular industrial product selected based upon its suitability for meeting a specific requirement of the customer 16 for an industrial product. Thereafter a query, denoted by the box, generally designated by the reference numeral 32 in FIG. 2 and labeled "QUERY" therein, is effected by the manufacturer 12 through the communications network 18 as to whether the customer 16 for the industrial products desires to place an order with the manufacturer 12 for the at least one particular industrial product identified by the manufacturer 12 based upon the industrial product's suitability for meeting a specific requirement of the customer 16 for an industrial product.

Figure 4:
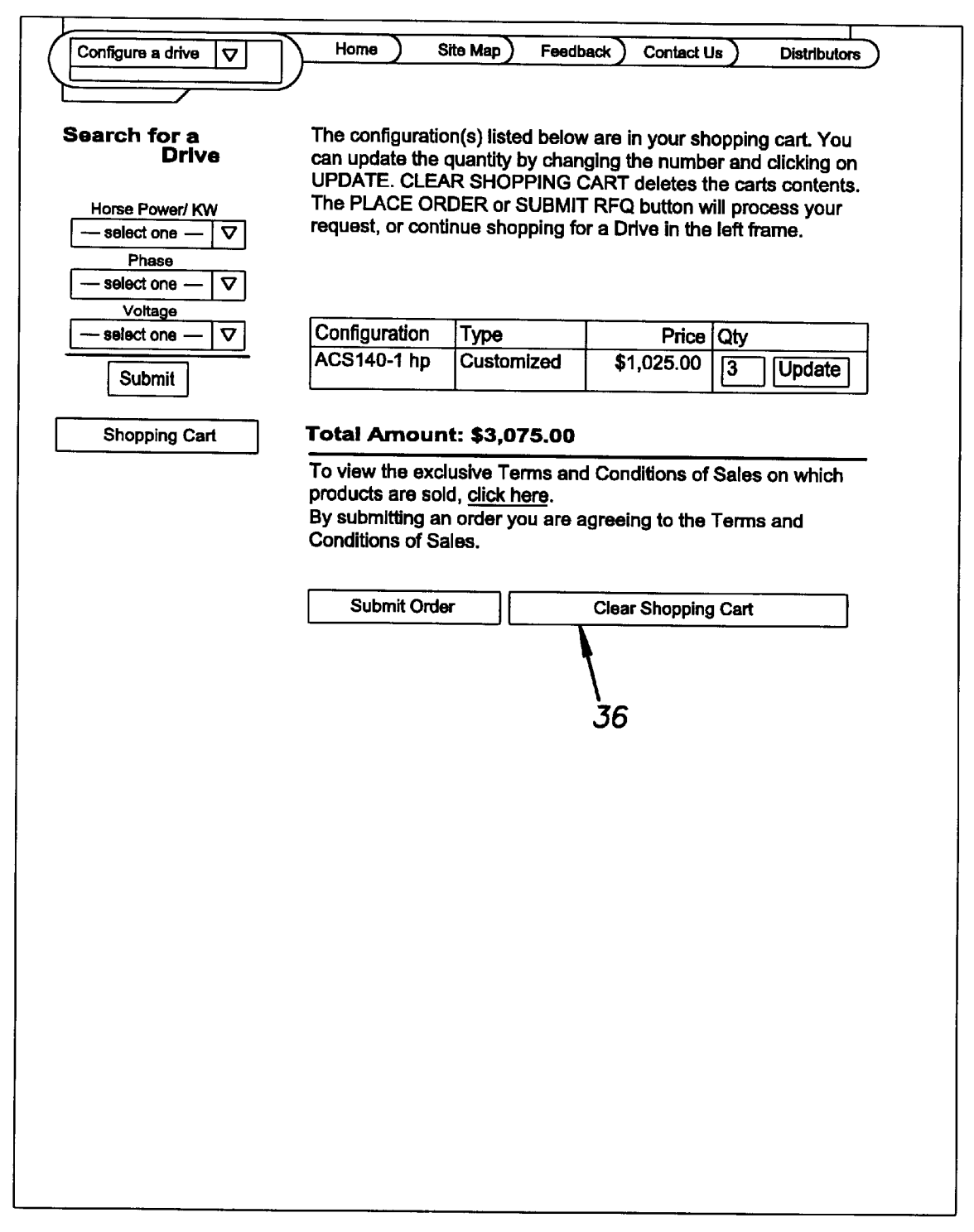

Illustrated in FIG. 3 of the drawing is the screen, generally designated by the reference numeral 34, which the customer 16 would access for purposes of utilizing the process 10. Illustrated in FIG. 4 of the drawing is the screen, generally designated by the reference numeral 36, which the customer 16 would access for purpose of complying with the request by the manufacturer 12 for specific information. Illustrated in FIG. 5 of the drawing is the screen, generally designated by the reference numeral 38, on which there would be displayed to the customer 16 by the manufacturer 12 the at least one particular industrial product, embodying the standard configuration thereof, selected by the manufacturer 12 based upon its suitability for meeting a specific requirement of the customer for an industrial product. Illustrated in FIG. 6 of the drawings is the screen, generally designated by reference numeral 40, on which there would be displayed to the customer 16 by the manufacturer 12 the at least one particular industrial product, with selected options, selected by the manufacturer 12 based upon its suitability for meeting a specific requirement of the customer for an industrial product.

While several embodiments of our invention have been shown and/or alluded to herein, it will be appreciated that modifications thereof, some of which have been alluded to hereinabove, may still be readily made thereto by those skilled in the art. We, therefore, intend by the appended claims to cover the modifications alluded to herein as well as all the other modifications which fall within the true spirit and scope of our invention.

What is claimed is:

1. A process for making available industrial products by the manufacturer thereof for online ordering through a communications network made accessible to customers therefor, the industrial products being made available based upon a selection by the manufacturer of such industrial products as a subset of an inventory set of industrial products manufactured by the manufacturer and for querying such customers as to their desire to place an order for at least one of the selected industrial products comprising:

a. effecting an identification by the manufacturer of the key parameters involved in a selection by the manufacturer of a subset of the industrial products from an inventory set of industrial products manufactured by the manufacturer, the inventory set of industrial products including all of the industrial products that may be made available by the manufacturer for online ordering by customers therefor through a communications network made accessible to customers;

b. placing such key parameters for the industrial products in a database of the industrial products manufactured by the manufacturer that are available for ordering by a customer;

c. making the database of the industrial products that are available for ordering by a customer accessible through the communications network to any customer for such industrial products having access to the communications network;

d. effecting a connection by a customer for such industrial products through the communications network to the database containing the key parameters for the industrial products;

e. effecting a request by the manufacturer through the communications network for specific information from the customer for subsequent assessment by the manufacturer of such requested specific information with respect to the key parameters for the industrial products in the database containing key parameters for the industrial products;

f. effecting an identification by the manufacturer of a subset of industrial products manufactured by the manufacturer based on an assessment of the requested specific information provided by the customer for the industrial products relative to the key parameters for the industrial products contained in the database, the subset of industrial products including at least one particular industrial product manufactured by the manufacturer selected by the manufacturer based upon the suitability of the at least one particular industrial product for meeting a specific requirement of the customer for an industrial product; and g. effecting a query through the communications network as to whether the customer for the industrial products desired to place an order with the manufacturer for the at least one particular industrial product identified by the manufacturer based upon the suitability of the at least one particular industrial product for meeting a specific requirement of the customer for an industrial product.

2. The process of claim 1 wherein said industrial products are drives.

3. The process of claim 1 wherein said industrial products are AC drives.

4. The process of claim 1 wherein the manufacturer effects the query through the communications network as to whether the customer desires to place an order with the manufacturer.

* * * * *